United States Patent [19]
Korpel

[11] 3,745,812
[45] July 17, 1973

[54] ACOUSTIC IMAGING APPARATUS

[75] Inventor: Adrianus Korpel, Prospect Heights, Ill.

[73] Assignee: Zenith Radio Corporation, Chicago, Ill.

[22] Filed: July 7, 1971

[21] Appl. No.: 160,285

[52] U.S. Cl............ 73/67.5 R, 73/67.5 H, 340/5 H, 340/5 MP, 350/3.5
[51] Int. Cl. .......................................... G01n 29/04
[58] Field of Search.................... 73/67.5 R, 67.5 H, 73/67.6; 350/3.5; 340/5 H, 5 MP

[56] References Cited
FOREIGN PATENTS OR APPLICATIONS
1,479,712  3/1967  France............................ 73/67.5 H OTHER PUBLICATIONS
An Optical Heterodyne Ultrasonic Image Converter, G. A. Massey, Proceedings of the IEEE, Vol. 56, No. 12, December 1968, pp. 2157-2161

Primary Examiner—Richard C. Queisser
Assistant Examiner—John P. Beauchamp
Attorney—John J. Pederson, John H. Coult et al.

[57] ABSTRACT

An object is irradiated with acoustic waves to develop a field of acoustic vibrations in a selected plane which is scanned by a focused light beam. An acoustically-perturbable light-reflective surface is located in this plane. A layer of optically-transparent material, of which the light-reflective surface forms one of the boundaries, has sufficient acoustic-wave attenuation in combination with its thickness to exhibit non-resonance to the acoustic energy. Variations in a reflection component of light from the surface are measured and utilized to generate an acoustic hologram or a conventional image of the object. Apparatus is depicted which compensates for differential attenuation of acoustic waves in a sound-propagative medium holding an object being irradiated.

17 Claims, 15 Drawing Figures

Inventor
Adrianus Korpel
By Peter J. Sgarbossa
Attorney

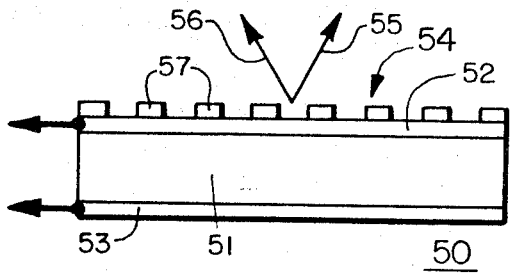
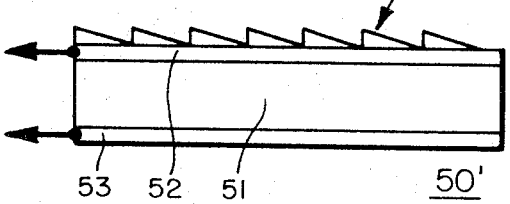
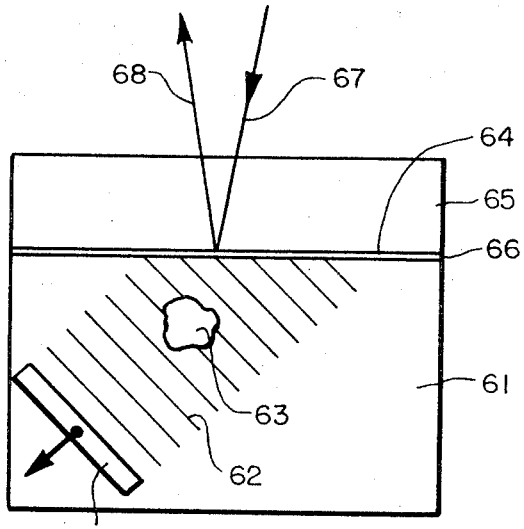
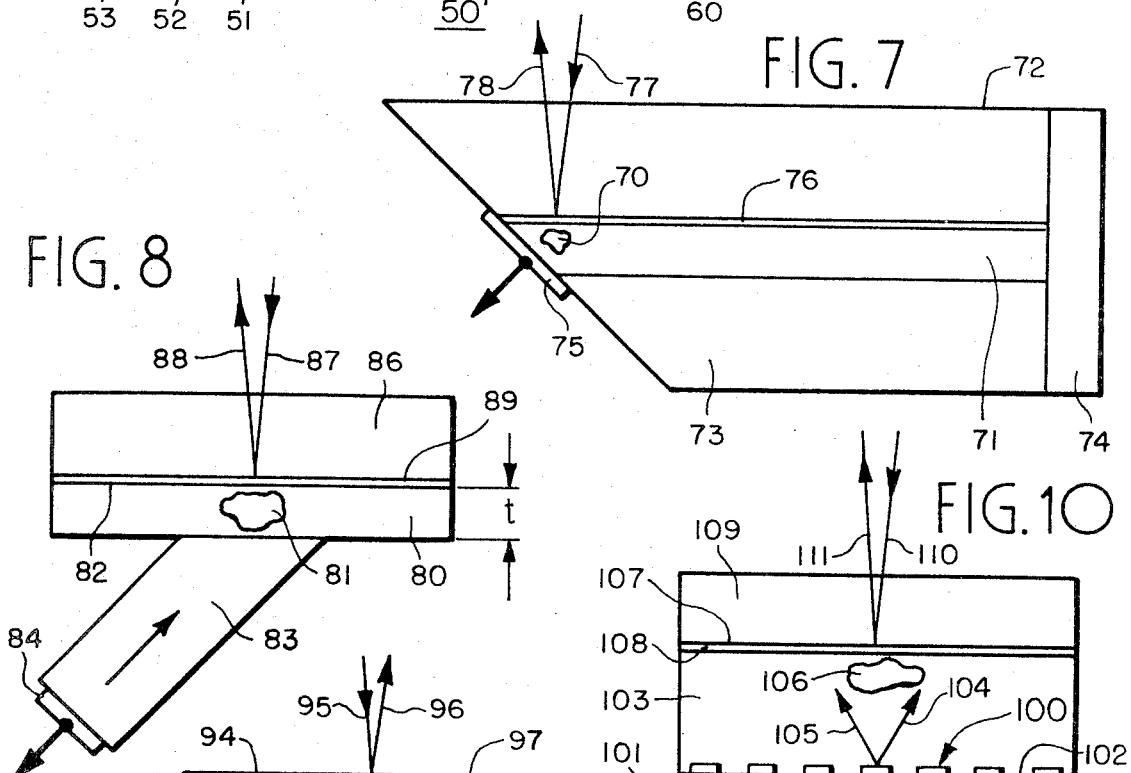
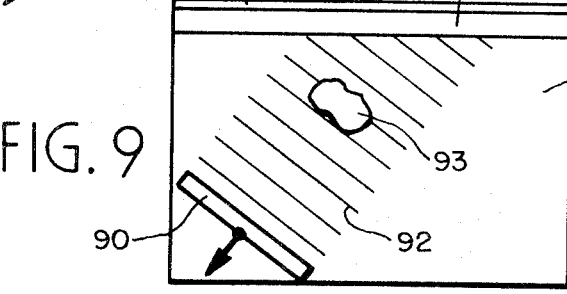
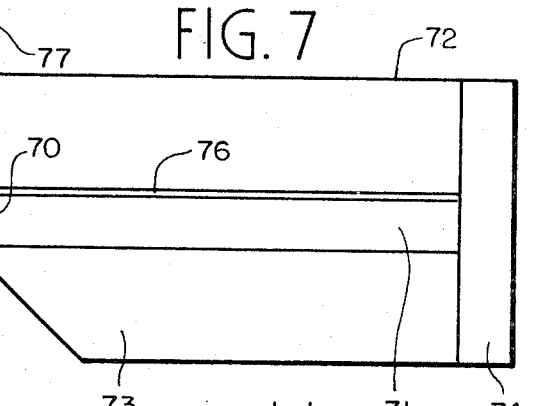
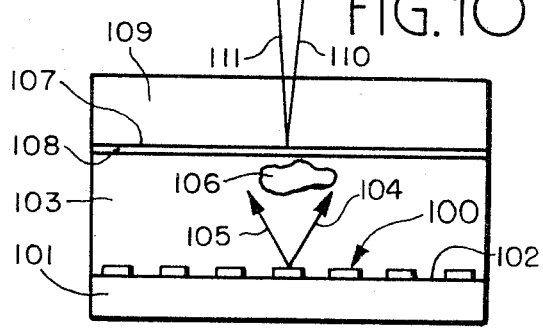

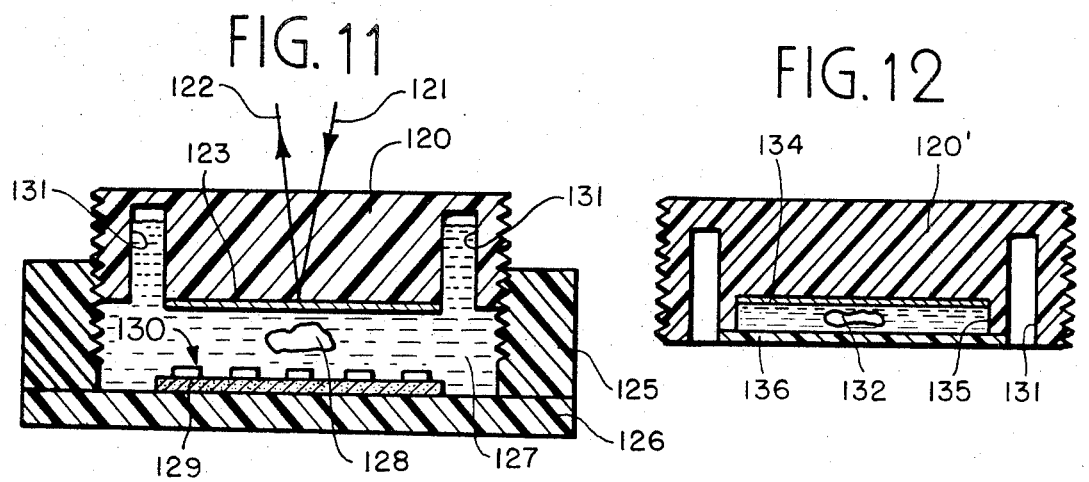
FIG. 11
FIG. 12
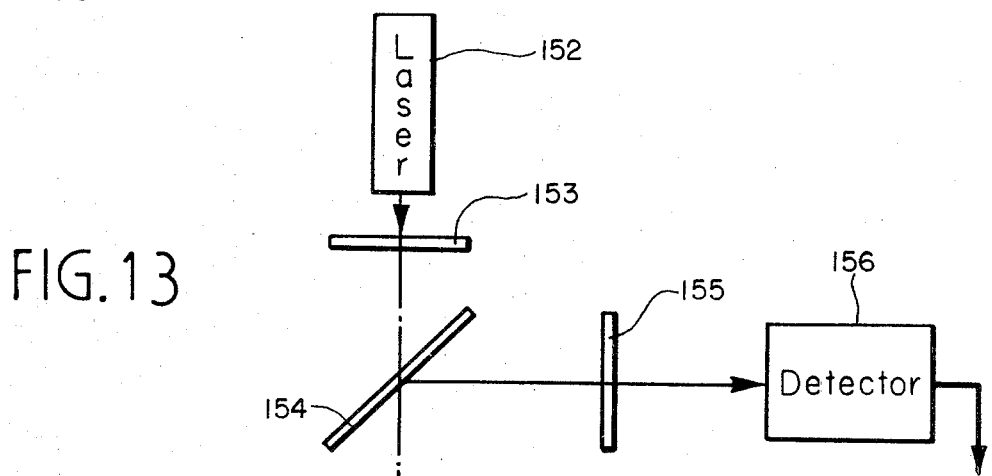
FIG. 13
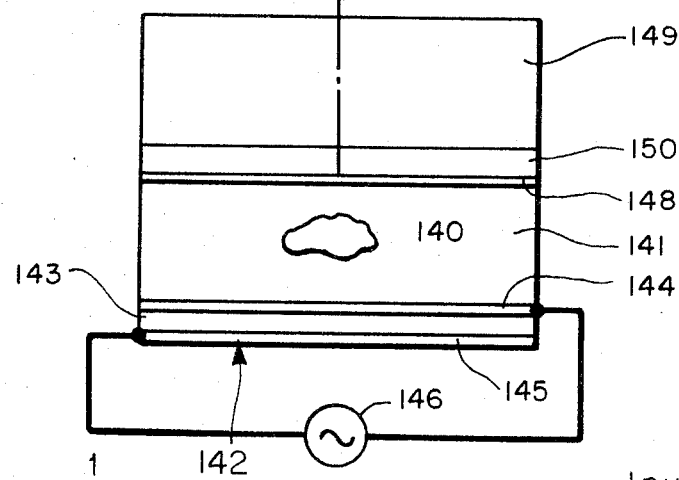
FIG. 13a
Inventor
Adrianus Korpel
By *Peter J. Sgarbossa*
Attorney 3,745,812

ACOUSTIC IMAGING APPARATUS

BACKGROUND OF THE INVENTION

The present invention relates to acoustic imaging and holography. More particularly, it pertains to improved apparatus for use in irradiating an object under study with acoustic waves that effect surface vibrations which, in turn, are scanned with a light beam.

It is now known to utilize a laser flying spot scanner in order to record an acoustic hologram by reading out the periodic deformations of a solid surface caused by an incident sound field. An object to be visualized is placed in a cavity where it scatters the sound propagating toward the surface. Each plane wave in the angular spectrum of the scattered sound field causes its own characteristic ripple pattern on the surface. Frozen in time, the composite pattern would constitute a hologram of the sound field recorded with a fictitious reference beam incident normal to the surface. The reflected light beam is partially intercepted by a knife edge after which it is detected. The periodic deflection of the light beam about the knife edge by reason of the surface vibrations is converted into an intensity modulation which results, in the detector, in an electrical signal that is processed in order to result in a stationary TV-type display of the original composite ripple pattern or acoustic hologram. A photograph may then be taken of the display screen after which the hologram may be reconstructed in the conventional manner.

A system of the foregoing character is illustrated and explained in an article entitled "Rapid Sampling of Acoustic Holograms by Laser-Scanning Techniques" by Korpel et al. which appeared in *The Journal of the Acoustical Society of America*, Volume 45, No. 4, Pages 881–884, April 1969. That system is also described and claimed in U.S. Pat. No. 3,585,848, issued on June 22, 1971 to Adrianus Korpel, and assigned to the same assignee as the present application. As disclosed in those references, the object to be irradiated is suspended in a fluid placed into a cavity formed in a block of solid material through which the acoustic waves are propagated. Using that arrangement, very good results have been demonstrated while using acoustic energy in a frequency range between approximately 1 and 10 megahertz. That range of frequencies is satisfactory to permit acoustic visualization in non-destructive testing and medical applications sufficient to reveal macroscopic structure. On the other hand, it is desired to be able to visualize much smaller structural detail comparable in size to between 1 and 100 wavelengths of visible light. Utilizing water as the sound propagating medium in which the object is suspended, for example, such acoustic microscopy requires radiation frequencies of the order of 0.03 to 3.0 gHz. For operation in that high a frequency range, the above-described apparatus is deficient. Among the reasons for that deficiency are excessive and/or unequal attentuation of the acoustic waves.

It is, accordingly, a general object of the present invention to provide new and improved acoustic imaging and holography apparatus which overcomes the aforenoted deficiencies.

A specific object of the present invention is to provide apparatus of this character which is particularly suitable for the use at frequencies above 100 megahertz.

A related object of the present invention is to provide new and improved acoustic irradiation structures.

The invention thus pertains to a system for recording an acoustic hologram or image of an object by irradiating the object with acoustic waves of a predetermined frequency content to develop a field of acoustic vibrations in a selected surface plane which is scanned with a focused light beam. Variations in a reflection component of light from the surface plane are measured. The irradiated object is immersed in a medium that propagates the acoustic waves. In accordance with one feature, the acoustic waves are launched in the medium along at least one path toward the object. Located in the surface plane beyond that object and in the path of the acoustic waves is a light-reflective surface. This surface forms an optical boundary of a layer of material, transparent to the light, that is located on the side of the surface plane opposite the wave-propagating medium. The transparent layer has sufficient acoustic wave attenuation in combination with its thickness as to exhibit non-resonance to the acoustic energy. According to another feature, the acoustic waves are launched in the medium in such a way that all laterally spaced portions of acoustic wavefronts encountering the object traverse equal acoustic path lengths through the medium, whereby equalized attenuation of the object-insonifying wavefronts by the medium is achieved.

BRIEF DESCRIPTION OF THE DRAWINGS

The features of the present invention which are believed to be novel are set forth with particularly in the appended claims. The invention, together with further objects and advantages thereof, may best be understood by reference to the following description taken in connection with the accompanying drawings, in the several figures of which like numerals indicate like elements, and in which:

FIG. 3b is a partially-schematic cross-sectional view taken along the line 3b—3b in FIG. 3a;

FIGS. 4 through 8 are diagrams representing various different apparatus alternative to that of FIGS. 3a and 3b;

FIG. 9 is a diagram of apparatus alternative to that of FIG. 6;

FIG. 10 is a diagram of a preferred combination of the apparatus of FIGS. 3a, 3b and 6;

FIGS. 11 and 12 are cross-sectional views of two different structural arrangements of apparatus more generally depicted in earlier ones of the figures;

FIG. 13 is a schematic block diagram of a system alternative to that of FIG. 1; and FIG. 13a is a representation of tri-coordinate axes adopted in connection with the explanation of FIG. 13.

DESCRIPTION OF THE PREFERRED EMBODIMENTS

Holography may be described as a method for recording and reconstructing the amplitude and phase distribution of a propagating field in a given plane. Imaging, on the other hand, refers to a method or system which concerns itself only with the amplitude, or rather the power which is proportional to the square of the amplitude. The preservation of phase in holography is of crucial importance in the sense that, upon reconstruction, the field is automatically reproduced faithfully everywhere in space and not only in the plane of the recorder. Thus, in the field of optics, holography has become identified with three-dimensional reconstruction. No such dramatic result or effect is achieved with acoustic holography because acoustic holograms are recorded at the wavelength of sound but are then reconstructed at the wavelength of visible light. Because of this scaling down in wavelength, a faithful three-dimensional reconstruction of the sound field in visible light is possible only if all three dimensions are scaled by a factor corresponding to the ratio between the light and sound wavelengths. For the usual range of sound frequencies heretofore employed, of the order of from 1 to 10 megahertz, a demagnification factor of from several hundred to several thousand is involved. It will thus be apparent that any reduction in the amount of the demagnification factor requires the use of sound of much higher frequencies. Moreover, if the field is reconstructed in such a way that there is no net change of length or width in the two lateral dimensions, this introduces a longitudinal excess magnification by a factor corresponding to the ratio between the sound and light wavelengths. The effect is similar to the exaggerated depth of field encountered in using binoculars or taking pictures with a telephoto lens.

In optical holography, an image field is made to interfere with a so-called reference beam and the resulting interference pattern is recorded on photographic or other film. This pattern consists of a system of fine fringes varying both in contrast and fringe spacing. The contrast at any particular point is a measure of the amplitude of the image field at that point, whereas the position of the fringes relates to the phase, with their spacing being determined by the slope of the image field wavefront relative to that of the reference beam. Thus, although the recording medium is basically responsive only to light power, it is nevertheless possible to record both light amplitude and light phase by using a reference beam. Reconstruction of the image field is accomplished by illuminating the recorded interference pattern with the original reference beam. Strictly speaking, this generates two related fields (conjugate images) which propogate in different directions and may be separated by spatial filters.

Figure 1:
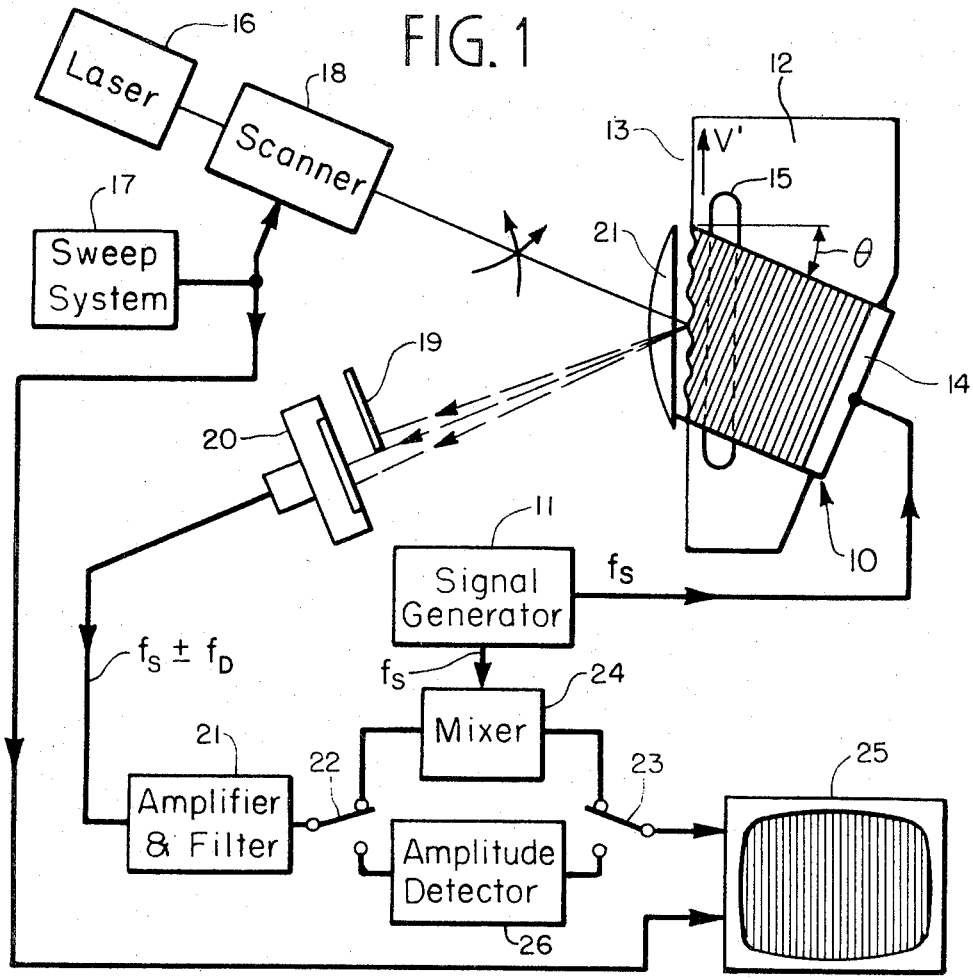
FIG. 1 is a schematic block diagram of acousto-optic apparatus as disclosed in the aforementioned references.

In acoustic holography obtained by the system of FIG. 1, the acoustic field of an irradiated object is translated to surface wave perturbations on a solid surface which is then scanned with a flying spot laser scanner. As shown, acoustic radiation apparatus 10 generates acoustic waves at a frequency $f_s$ determined by that of an applied electric signal from a signal generator 11. As presented in the aforesaid references, the acoustic signal range for the particular acoustic radiation structure of FIG. 1 is in the range from 1 to 10 mergahertz.

Acoustic radiation apparatus 10 constitutes a block of suitable solid material such as methyl methacrylate (e.g., "Lucite" supplied by E. I. DuPont de Nemours, Inc.), polystyrene, or other plastic material. The block has a surface 13 which is rendered highly reflective by the provision of a surface film of polished gold or the like. Acoustically coupled to block 12 is a piezoelectric transducer 14 which is responsive to electrical signals of predetermined frequency content from generator 11 to propagate acoustic waves toward reflective surface 13 in a direction forming an angle $\theta$ with respect to normal incidence. The wavefronts (represented by the regularly spaced lines parallel to transducer 14) of the acoustic waves are thus inclined at angle $\theta$ with respect to surface 13. Accordingly, the sound waves strike surface 13 at the angle $\theta$, thereby causing a displacement component to run upwards across surface 13 with a velocity $v'$ which is equal to $v_b/\sin \theta$, where $v_b$ is the bulk sound velocity inside block 12. Sound wave reflections are eliminated or reduced to negligible amplitude by roughening the remaining surfaces of block 12 or lining them with sound absorbing material. Alternatively, the block may be so dimensioned that the reflected wave is sufficiently attenuated by inherent absorption in the material.

A cavity or slot 15 is machined into block 12 and filled with a liquid acoustic wave transmission medium. At acoustic frequencies of a few megacycles, the size and shape of cavity 15 are not critical and, if desired, the construction may consist simply of a relatively thin-walled tank filled with water or other suitable liquid. In any apparatus designed specifically for use with a particular type of object or specimen, cavity 15 is preferably formed to orient the specimen at the desired acute angle $\theta$ to the acoustic wavefronts. As shown, block 12 is made of methyl methacrylate plastic and slot 15 is filled with water. If greater sensitivity is required, acoustic impedance matching may be provided by the appropriate selection of materials and the interpositioning of impedance matching layers at the interfaces between the liquid and solid media.

In operation, the object to be visualized is placed inside the cavity where it scatters the incident sound beam. Each plane wave in the angular spectrum of the scattered sound field causes its own characteristic ripple pattern on front surface 13 of block 12. If the composite ripple pattern were recorded optically by known stroboscopic Schlieren techniques, it would constitute a hologram of the sound field recorded with a fictitious reference beam incident normal to surface 13 of block 12. With such techniques, however, the attainable contrast is critically dependent upon the optical quality of the surface and has been found to be generally not sufficiently high to permit such direct photographic recording. In the illustrated system, most of the background noise due to optical imperfections is suppressed by electronic filtering which results in a very substantial increase in sensitivity and greatly improved image contrast.

Surface 13 of block 12 is scanned in a predetermined raster pattern with a focused beam of coherent light from a laser 16. For convenience, the scanning raster may be a standard television raster, and scanning may be synchronized by conventional television synchronizing circuits or systems 17. A laser scanning system 18 is of the acoustic Bragg diffraction type described, for example, in an article entitled "A Television Display Using Acoustic Deflection and Modulation of Coherent Light" by Korpel et al., *Applied Optics*, Volume 5, Number 10, October 1966, Pages 1667-1675. The light reflected from surface 13 is partially intercepted by a knife edge 19, the unobstructed part of the reflected light being incident on a photodetector 20. A lens 21 images the exit pupil of the scanning system onto the knife edge, then insuring that all reflected beams are equally intercepted, regardless of the scanning angle. At the same time, the incident laser beam is focused to a diffraction-limited spot size smaller than one-half wavelength of the acoustic surface perturbations caused by the incident sound waves.

Under these conditions, the reflected light is deflected periodically by a small amount as indicated by the broken lines. This periodic deflection is converted into intensity modulation by the knife edge, which in turn results in an electrical carrier signal being produced by the photodetector. If the sampling light were stationary, the frequency of this signal would be equal to the sound frequency $f_s$. However, the scanning motion of the beam causes a Doppler frequency shift $f_d$ the magnitude of which depends on the relative magnitude and direction of the surface ripple velocity and the scanning speed. Each individual ripple pattern results in a characteristic Doppler component. The output signal from photodetector 20 includes the composite Doppler signal and, after amplification by an amplifier 21, is applied (when switches 22 and 23 are in their upper positions as shown) to a mixer 24 for heterodyning with the original sound frequency $f_s$ from signal generator 11 to produce a composite Doppler signal $f_d$ which is applied to a TV monitor 25. Monitor 25 is connected to sweep synchronizing system 17 for synchronous operation with laser scanner 18. This results in a stationary display for the original composite ripple pattern which constitutes the acoustic hologram. A photograph taken of the TV screen constitutes a permanent holographic recording which may be reconstructed in a conventional way, i.e., by illumination with an appropriate reference beam. When switches 22 and 23 are operated to their lower contact positions, the output of amplifier 21 is applied to an amplitude detector 26 and a non-holographic or conventional picture of the sound field at surface 13 is produced on the image screen of monitor 25. The knife edge detector is sensitive only to acoustic ripple patterns traveling in a direction transverse to the intersecting edge. If it is desired to make the system responsive to acoustic ripple pattern components in all directions, knife edge 19 may be replaced by an intercepting element having a circular aperture for detecting periodic variations in the focusing and defocusing of the reflected light beam.

Figure 2:
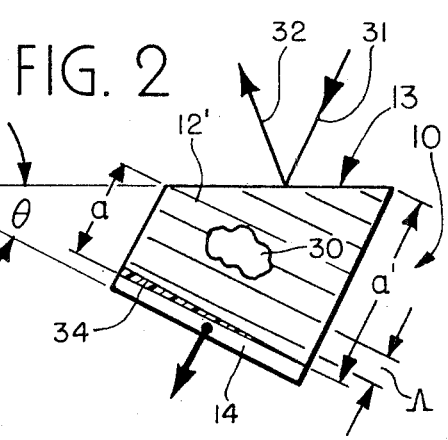
FIG. 2 is a schematic representation of a portion of the apparatus in FIG. 1 including an improvement therein.

FIG. 2 includes a more schematic representation of the acoustic irradiation apparatus in the system of FIG. 1. In FIG. 2, the sound-propagating portion of block 12 is represented more generally as simply a sound-propagating medium 12'. Thus, transducer 14 launches the acoustic waves toward surface 13, and an object 30 to be irradiated is immersed in the path of the acoustic waves within medium 12'. The scanning laser beam arrives along a path 31 and its reflection component traverses a path 32 toward knife edge 19 in FIG. 1. The nominal direction of sound incidence is at angle $\theta$ with respect to surface 13 on which the ripple patterns are developed. Angle $\theta$ is selected so that the spatial ripple frequency is reasonably high. A suitable value for anlge $\theta$ is 45°. In operation, object 30 scatters the incident plane wave of sound into a multiplicity of directions with each differently-directed sound portion impinging upon surface 13 creating the characteristic ripple pattern which then is "read off" by the scanning laser beam.

By reason of the angled orientation between the nominal direction of travel of the acoustic waves and surface 13, different portions of the acoustic wavefronts travel unequal distances through medium 12' before reaching surface 13. That is, a portion of an acoustic wavefront near the left side of FIG. 2 travels a distance $a$, while a portion of the same wavefront near the right side of the apparatus in FIG. 2 travels a substantially greater distance $a'$. Consequently, the acoustic waves in one portion of the path between transducer 14 and surface 13 travel a greater distance than those in another portion as a result of which the former are attenuated to a greater degree than the latter. Using water for medium 12', acoustic losses within medium 12' at 100 mHz are approximately 2 db/mm, while at 1,000 mHz they rise to a level of approximately 200 db/mm. In a practical embodiment at 100 mHz, the resultant variation in sound intensity across the width of object 30 by reason of the differential attenuation may approximate 5 db, resulting in a corresponding amplitude distortion in the holographic information derived by knife edge 19 and detector 20 in FIG. 1.

One approach to compensating such undesired ultimate distortion is to construct transducer 14 in a manner so that it produces a gradation in sound amplitude across its width in correspondence with the variation in path lengths to surface 13 across that same width; in that case, the acoustic amplitude would linearly increase with distance from generally the left edge of transducer 14 in FIG. 2. As a specific technique, then, the irradiating apparatus of FIG. 2 is modified to include compensating means for equalizing the amplitude of the acoustic waves arriving at surface plane 13 in correspondence with the difference in attenuation of the waves in the respective different path portions distributed laterally across the overall wave path. Specifically in this version, the launching face of transducer 14 is coated with a layer 34 of a material, such as a comparatively thin film of rubber or plastic, that is partially attenuative of the acoustic waves. The thickness of layer 34 in the direction of wave propagation is tapered so that the amount of attenuation varies substantially linearly in the lateral direction and inversely in proportion to distance of the different path portions from transducer 14 to the corresponding portions of surface plane 13.

Figure 3A:
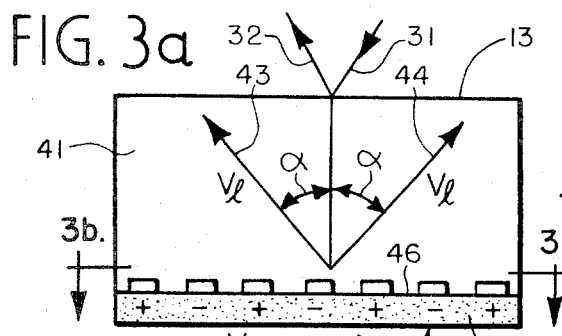
FIG. 3a is a partially-schematic representation of one form of sound-irradiation apparatus that may be substituted in FIG. 1 for the apparatus of FIG. 2.
Figure 3B:
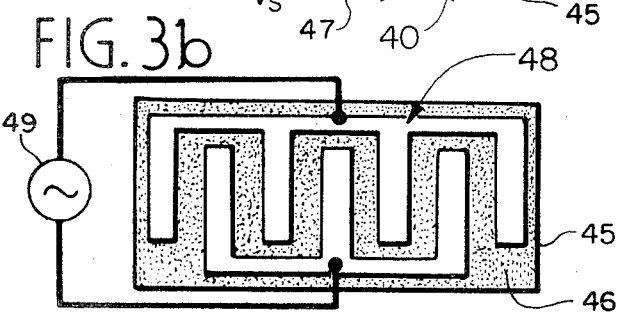

FIGS. 3a and 3b illustrate a distinctly different approach for equalizing the amplitude of the different laterally spaced portions of the acoustic waves arriving at surface plane 13. In this case, a launching transducer 40 is arranged generally parallel to surface plane 13 which launches into the wave propagating medium 41 acoustic waves propagating along a pair of paths, represented by vectors 43 and 44 in FIG. 3a, that define respectively opposing acute angles $\alpha$ with respect to a normal to surface plane 13. Because transducer 40 is parallel to surface plane 13, all laterally spaced portions of the waves launched thereby travel equal distances through the medium 41 and are therefore attenuated equally by the medium. As before, the light beam incident upon surface 13 arrives along a path 31 and its reflection component departs along a path 32. More particularly, transducer 40 includes a substrate 45 having a surface 46 exposed to medium 41 and along which the sound waves travel in the surface-wave mode in the direction indicated by arrow 47 and at a velocity $V_s$. Being coupled to medium 41, the travelling surface waves develop acoustic waves in a compressional-wave mode that propagate toward surface 13.

While various mechanisms are now known for launching acoustic surface waves along surface 46 of substrate 45, transducer 40 in this case includes an array 48 of interleaved combs of conductive material affixed to surface 46 and which are individually coupled across respective terminals of a source 49 of sound signals. Substrate 45 is of a piezoelectric material, such as PZT or lithium niobate, and the electrodes of array 48 typically are formed of gold or aluminum deposited upon planar surface 46. The electrode teeth in the combs of array 48 are separated by a center-to-center spacing of one-half wavelength in the substrate material at the frequency of the signals from source 49. The signals from source 49 piezoelectrically induce surface waves that propagate on surface 46 in both directions perpendicularly to the electrode teeth in array 48. Preferably, the opposing end portions of surface 46 are coated with a material that absorbs the acoustic wave energy in order to prevent reflection from the ends back beneath the electrodes. Alternatively, the lateral edges of surface 46 are carefully machined to be an appropriate distance from the nearest electrode teeth so that reflected surface waves again arrived under array 48 with the same phase as the waves directly developed by the teeth. At any given instant, the different electrode teeth alternate in polarity as indicated by the series of plus and minus signs beneath the respective different electrode teeth.

The two compressional waves radiated into medium 41 by the surface waves propagate in the medium at a velocity $V_1$ at angles to the normal of $\pm\alpha$, where $\sin \alpha = V_s/V_1$. In a typical example, substrate 45 is PZT that exhibits a surface wave velocity $V_s$ of approximately 2,000 m/sec., and medium 41 is water that exhibits a compressional wave velocity $V_1$ of approximately 1,500 m/sec. For those conditions, angle $\alpha$ is approximately 45°.

In operation, each of the two different compressional waves developed in medium 41 intercept an object immersed in the medium between transducer 40 and surface 13 to develop their own individual spectrums of scattered waves. The compressional waves represented by vector 44 create a surface ripple pattern travelling to the right on surface 13, while the compressional waves following the other path represented by vector 43 develop a ripple pattern on surface 13 that travels in the opposite direction. In response to that difference in direction of ripple travel on surface 13, the portion of the light reflected along path 32 by one travelling ripple pattern is Doppler shifted in frequency in a direction the opposite of the Doppler shift in the frequency of the light reflected by the other ripple pattern. In order effectively to separate the two different spectra so that the information in only one is ultimately fed to monitor 25 in FIG. 1, amplifier 21 includes a filter selective of only one of the two different Doppler components in the resultant electrical signal developed by detector 20. This mode of electronic separation of the two different spectra is effective so long as the respective Doppler shifts do not overlap. For the case where $\alpha = 45°$, such overlap occurs only for scattering angles larger than 45°.

FIG. 4 depicts an alternative transducer 50 that may be substituted for transducer 40 of FIGS. 3a and 3b in order to develop the compressional waves all laterally spaced portions of which travel along paths of equal length in medium 41. In this case, transducer 50 is directly of the compressional-mode type, being constructed of a sheet of piezoelectric material 51 sandwiched between a pair of electrodes 52 and 53 that in use are individually coupled across respective terminals of source 49. Spaced laterally across the surface of transducer 50 exposed to medium 41 is a phase grating 54 that serves to resolve the compressional-wave energy developed by the transducer into a pair of components travelling along angularly-related paths indicated by arrows 55 and 56. As such, operation of a phase grating in this manner is known, and the grating itself may be constructed by depositing upon the external surface of electrode 52 a series of stripes of dielectric or conductive material and spaced apart across the width of the transducer. A number of other structures are also known for use as a phase grating that serves either to change the direction of acoustic wave propagation or to resolve the same into a plurality of differently directed components. As just one example, FIG. 5 illustrates the use of a so-called blazed grating 58 which is composed of a series of tapered sections or wedges distributed across the width of a transducer 50'. As well known, a blazed grating like that shown in FIG. 5 may be designed so as to generate but a single wavefront at any desired angle.

As so far discussed, the incident light beam is reflected at a solid-air interface formed by surface 13. As also mentioned, that surface preferably is coated with a film such as gold in order to render it more-highly reflective. In principle, it is also possible to use the surface of the medium in which the object is suspended for reflecting the light. Utilizing a liquid medium, however, that approach is impractical because of instability of the liquid surface and the typical small reflectivity of such a surface to the scanning laser beam. The production of the acoustic ripple pattern on a surface at a solid-air interface is disadvantageous by reason of the existence of a critical angle $\theta_C$ for the acoustic waves with respect to the normal to the interface between the solid and the medium in which the object is immersed. When the acoustic waves are incident upon the surface at an angle larger than $\theta_C$, they are totally reflected and, hence, do not develop the desired ripple pattern on the solid-air interface. The critical angle $\theta_C$ is defined by the relationship $\sin \theta_C = V_1/V_o$, where $V_o$ is the compressional-mode sound velocity in the material between the object-immersing medium and the light-reflective surface film. For example, utilizing Lucite (TM) for the material in block 12 in FIG. 1 and water for the medium within cavity 15, the value of $\theta_C$ is approximately 34°. Consequently, this limits the nominal angle of incidence relative to the normal to surface 13 to a value of about 17°. Since larger angles lead to better resolution, the principles attendant to the construction of the apparatus in FIG. 6 preferably also are incorporated into the irradiation apparatus.

In FIG. 6, a transducer 60 is disposed in an acoustic-wave-propagating medium 61 in a position to propagate acoustic waves, indicated by wavefronts 62, toward an object 63 at an acute angle with respect to a surface plane 64. A layer 65, of material transparent to the light, is located on the side of surface plane 64 opposite medium 61. The surface of layer 65 facing medium 61 defines plane 64 and is coated with a film 66 of gold or the like that does not interfere with the perturbation of the surface of layer 65 in response to the acoustic waves scattered by object 63. In addition to developing the desired ripple patterns, film 66 also is highly reflective to the light. That is, film 66 serves as a boundary of an optically-transparent region composed of layer 65. In this case, the incident beam of light arrives along a path 67, while its reflection component departs along a path 68. The incoming beam of light is transmitted through the thickness of layer 65 and is focused to its diffraction-limited spot at reflective coating or film 66. Moreover, layer 65, of a material such as Lucite, is of sufficient thickness, in view of its properties of attenuation of the acoustic waves, that it exhibits non-resonance to the acoustic energy. Such a resonant effect, using Lucite, is avoided so long as the thickness of layer 65 is more than a few millimeters; apart from that, the thickness of layer 65 is arbitrary. Because conditions within layer 65 are inherently unfavorable for Bragg interaction between acoustic and light energy, the resultant deflection of the reflection components of the incident light beam are essentially entirely the effect of the ripple patterns induced in reflective film 66 by acoustic wave energy scattered by object 63. At the same time, it is possible to operate at angles larger than the aforementioned critical angle $\theta_c$ for the incidence of acoustic wave energy upon film 66.

FIG. 6 is merely illustrative of a number of different apparatus in which advantage may be taken of the general approach of disposing the light-reflecting film at the initial interface with the medium in which the object is suspended while at the same time transmitting the light through a covering, non-resonant layer. Of course, the problem of unequal attenuation of the acoustic waves in paths of different lengths, discussed above in connection with FIG. 2, may likewise be present in the apparatus of FIG. 6. Accordingly, it is additionally contemplated that FIG. 6 be modified, as by incorporating a variable-thickness layer of partially-attenuative material on the launching surface of transducer 60, in the manner that layer 34 is included in the apparatus of FIG. 2. In general, FIG. 6 is intended primarily to illustrate in a rather basic form the fundamental structural principles of interest. The actual overall physical configuration may take a variety of forms.

For example, one embodiment of the principles of FIG. 6 is that of FIG. 7 in which an object 70 is suspended within a liquid medium 71 contained within an enclosure formed by spaced layers 72 and 73, the container for the liquid being closed at one end by a block 74 and at the other end by a transducer 75. Layers 72 and 73 as well as block 74 all may be constructed of a plastic such as Lucite, and the liquid medium again may be water. Finally, the side of layer 72 facing medium 71 is coated with a film 76 that again is highly reflective of the light entering along a path 77 and departing along a path 78. As in FIG. 6, the thickness of layer 72 is sufficient to render it non-resonant to the acoustic waves, and the manner of operation is the same as described in connection with FIG. 6. The basic difference from FIG. 6 is that the FIG. 7 apparatus utilizes the transducer as one wall of the container for the medium and may be removable for the purpose of inserting object 70. As before, transducer 75 launches the acoustic waves toward film 76 at an acute angle with respect thereto.

As a different approach to reducing the problem of differential attenuation of the acoustic wave energy through the medium in which the object is immersed, the irradiating apparatus of FIG. 8 is arranged so that the thickness t of the immersing medium 80 is only slightly greater than the dimension of an object 81 so as to minimize the attenuation in all portions of the acoustic wave path through medium 80. At the same time, the arrangement for launching the acoustic waves at an angle to a light reflecting surface 82 includes a wave-transmission element 83 coupled at one end to medium 80 and at its other end to a transducer 84. Element 83, which may be a single-crystal material, exhibits attenuation to the acoustic waves in an amount substantially less than that of medium 80 that once more may be water. As in FIG. 6, medium 80 is covered by a comparatively thick transparent layer 86 through which the light enters on a path 87 and departs on a path 88 after reflection from a light-reflective film 89 disposed on the side of layer 88 facing medium 80.

Incorporated into the irradiation apparatus of FIG. 9 is a different approach for achiving a high degree of interaction between the acoustic waves and the ripple patterns developed in the light-reflecting surface. In this case, a transducer 90 disposed in a wave-propagating medium 91 directs acoustic waves indicated by wavefronts 92 toward an object 93 suspended in medium 91, the wavefronts again impinging upon a boundary of medium 91 at an acute angle. As before, the acoustic energy represented by waves scattered by object 93 reaches a light-reflective coating or film 94 to develop certain ripple patterns which deflect light reflected along a path 95 as a result of incident light along a path 96. Here, however, light-reflective coating 94 is separated from wave-propagating medium 91 by a layer 97 of a material that exhibits minimal losses to the acoustic energy and is of such thickness as to exhibit vibratory resonance in response to the acoustic waves. While achieving a high degree of interaction between the scattered acoustic energy and the surface ripples, the apparatus as shown in FIG. 9, nevertheless, is subject to the limitation of a comparatively narrow value of the above-discussed critical angle $\theta_c$.

Considering all of the different structural principles discussed so far in connection with their various different advantages and disadvantages, one preferred structural form of the irradiation apparatus is that shown by FIG. 10. In essence, FIG. 10 represents a combination of the structures of FIGS. 3a, 3b and 6. Thus, an electrode array 100 disposed on a piezoelectric substrate 101 serves to launch acoustic surface waves on a substrate surface 102 coupled to a wave-propagating medium 103. As in FIG. 3a, the acoustic surface waves are coupled to medium 103 to develop compressional waves that propagate along two angularly-related paths represented by arrows 104 and 105 toward an object 106 and both at an angle with respect to a surface plane 107. In the manner of FIG. 6, surface plane 107 is defined by a film 108 affixed to the surfaces of a transparent layer 109 facing medium 103. The incident light beam arriving along a path 110 is transmitted through transparent layer 109 and focused optimally to a spot size of one-half acoustic ripple wavelength. Again as before, the reflection component of the light departs along the path 111 toward the detection system of FIG.

1. Accordingly, the arrangement of FIG. 10 achieves the compensation or equalization for differential attenuation within the wave propagating medium while at the same time obtaining efficient interaction between the acoustic energy scattered by the object and the holographic-representative ripples generated in the light-scanned surface. Also, the structural principles of FIG. 6 are incorporated so that operation past the critical angle $\theta_C$, for sound incidence upon the ripple surface, is made possible.

Further in terms of actual structural implementation of the irradiation apparatus of FIG. 10, it may be as simple and yet convenient as that which is shown in FIG. 11. Thus, an externally threaded plug 120, of Lucite or the like, serves the purpose of the transparent layer for the incoming and departing light quantities represented by arrows 121 and 122. Affixed to the underside of plug 120 is a light-reflective film 123 upon which, in use, the incident light is focused. Plug 120 is threadably received within a collar 125 closed across its other end by a slab 126; again, both collar 125 and slab 126 may be constructed of Lucite. Within the chamber defined between slab 126 and film 123 is a wave-propagating medium 127 in which an object 128 is suspended or immersed. Disposed between slab 126 and object 128 is a piezoelectric substrate 129 on the upper surface of which is an electrode array 130. As in FIG. 3a, electrode array 130 responds to input electrical signals for once more developing acoustic surface waves that travel along the surface of substrate 129 in contact with medium 127. This results in the already-discussed pair of compressional waves being launched toward object 128 and on into interaction with film 123 for the purpose of developing the ripple patterns to be detected. For the purpose of insuring that medium 127 fills the entire space between substrate 129 and film 123, plug 120 is in this case formed to include a passageway or recess 131 into which medium 127 is admitted as the plug is threaded into place.

In the alternative of FIG. 12, a plug 120' is similar to plug 120 of FIG. 11 except that it is constructed so as also to serve as a specimen holder for an object 132. A recess 133 is bored into the bottom surface of plug 120' and a light-reflective film 134 then is deposited across the bottom of that recess. Across the bottom of and covering recess 133 is a thin membrane 136 (or merely a wire grid) that is permeable to medium 127 (FIG. 11) and serves to define within the recess a chamber in which object 132 is disposed. When plug 120' is threaded into collar 125, medium 127 thereupon rises into the chamber defined within the recess as well as into the passageway 131.

In some cases, it may be necessary or at least desirable that the nominal direction of the acoustic waves be at right angles to the light-reflective surface plane. In that case, the knife-edge detection approach of FIG. 1 is not appropriate. FIG. 13 illustrates a different system that takes advantage of certain birefringent or elastooptic anisotropic properties of a material in order to permit detection of the scattered wave spectrum. In this instance, an object 140 is immersed in a medium 141 propagative of compressional waves launched by a transducer 142. Transducer 142 as shown is simply a slab 143 of piezoelectric material sandwiched between a pair of electrodes 144 and 145 coupled across a source of sound signals 146. At the other side of medium 141 is a light-reflective layer 148 once again associated with a layer 149 of Lucite or the like through which the incoming and outgoing light is transmitted. Sandwiched between transparent layer 149 and reflective film 148 is a layer 150 of an anisotropic material having a thickness no greater than one-half the wavelength of the acoustic waves in that material. A beam of coherent, collimated light from a laser 152 is incident upon reflective film 148 after traversing a quarter-wave optical plate 153 and a partial mirror 154, the light impinging upon film 148 at right angles thereto. The reflection component from film 148 travels backwardly along the same path to partial mirror 154 where it is reflected through an optical polarization analyzer 155 to a photodetector 156 which develops an electrical output signal in response to the light it receives.

Anisotropic sheet 150 exhibits the property that the periodic optical phase delay induced by the sound perturbations in film 148 is different for directions of polarization indicated by vectors 2 and 3 in FIG. 13a. That is, in terms of the strain-optic coefficients $p_{12}$ and $p_{13}$, sheet 150 is characterized by the expression $p_{12} \neq p_{13}$. Stated another way, sheet 150 exhibits unequal strain optic coefficients in orthogonal directions parallel with the surface plane defined by film 148. One such material is $\alpha\,AL_2O_3$. This a sapphire in which $p_{13}$ is extremely small, $p_{12}$ is approximately 0.08 and $p_{13}$ is approximately zero.

In operation, the light emitted by laser 152 is initially linearly polarized. That characteristic is then converted to circular polarization by quarter-wave plate 153. Upon reflection from film 148 through anisotropic sheet 150, a polarization component of the light field in any direction other than that of the vectors 2 and 3 in FIG. 13a is amplitude modulated at the sound frequency and to a degree proportional to the difference between the magnitudes of $p_{12}$ and $p_{13}$. Upon subsequent passage of the reflected light through analyzer 155, the function of the analyzer is to pass that amplitude modulation component to detector 156. For optimum operation, the polarization axis of analyzer 155 is positioned at an angle of 45° with respect to the directions of both vectors 2 and 3. Further analysis of the polarization characteristics and operational parameters of a system like that in FIG. 13 will be found in my copending application Ser. No. 169,019, filed Aug. 4, 1971 and assigned to the same assignee as the present application. Within the ambit of the present application, a principal feature of the apparatus of FIG. 13 is the advantageous use of transparent layer 149 for the purpose, as previously described in connection with FIG. 6, of improving the optical recovery and ripple development characteristics of the apparatus for irradiating the object under study.

In general, all of the different embodiments have been described with respect to the use in systems for acoustic holography or imaging. The various structural arrangements for the different object irradiation apparatus permit, either singly or in combination, advantageous improvement in terms of efficiency, flexibility of usage, minimization of distortion or convenience. The overall result of the various different improvements discussed is to permit the development of practical acoustic microscopes useful at sound frequencies of, for example, 100 mHz so as to permit obtaining a resolution corresponding to one to two wavelengths of sound which, in turn, corresponds to 15 to 30 $\mu$m. Such a microscope has a sensitivity of approximately $10^{-3}$ watts per cm², yields a field of view of about 10 square mm, and exhibits a capability of phase contrast imaging and holography. As indicated, read out may be in real time either conventionally or holographically. The same apparatus approaches are appropriate to the construction of an acoustic microscope operative at even much greater frequencies, for example, of the order of 1,000 mHz so as to permit a resolution of the order of 1.5–3.0 μm.

While particular embodiments of the invention have been shown and described, it will be obvious to those skilled in the art that changes and modifications may be made without departing from the invention in its broader aspects and, therefore, the aim in the appended claims is to cover all such changes and modifications as fall within the true spirit and scope of the invention.

I claim:

1. In a system for recording an acoustic hologram or image of an object by irradiating the object with acoustic waves of a predetermined frequency content to develop a field of acoustic vibrations in a selected surface plane beyond said object in the path of said acoustic waves, scanning the surface plane with a focused light beam and measuring variations in a reflection component of light from the surface plane, acousto-optic apparatus comprising:
a medium, in which said object is immersed, propagative of said acoustic waves;
means for launching said acoustic waves in said medium along at least one path toward said object;
a layer of light-transparent material located on the side of said surface plane opposite said medium and having sufficient acoustic-wave attenuation in combination with its thickness to exhibit non-resonance to the acoustic energy;
and a light-reflective coating on a surface of said layer located substantially in said surface plane.

2. A system as defined in claim 1 in which the path of said acoustic waves defines an acute angle with said surface plane.

3. A system as defined in claim 1 in which said launching means includes a transducer immersed in said medium and directing said acoustic waves toward said object at an acute angle to said surface plane.

4. A system as defined in claim 1 in which said launching means includes a transducer defining one wall of a chamber in which said medium is contained and oriented to direct said acoustic waves toward said object at an acute angle to said surface plane.

5. A system as defined in claim 1 in which said launching means includes a wave-transmission element acoustically coupled at one end to said medium and a transducer coupled to the opposite end of said element for delivering said acoustic waves into said element, said element exhibiting an attenuation to said acoustic waves substantially less than that of said medium.

6. A system as defined in claim 1 in which said launching means includes a substrate having a surface exposed to said medium and arranged parallel to said scanned surface plane along which sound waves travel in the surface-wave mode to develop said acoustic waves in a compressional wave mode propagating in said medium effectively along a pair of paths toward said object and at an acute angle to said surface plane.

7. A system as defined in claim 6 which further includes:

an externally threaded plug the interior of which constitutes said layer and with said coating being affixed to said layer;
and a collar threaded on said plug and defining a chamber within which said medium and said substrate are disposed.

8. A system as defined in claim 7 in which said plug defines a passageway into which said medium is admitted as the plug is threaded into said collar.

9. A system as defined in claim 1 in which said layer defines a recess facing said medium, said coating is affixed in the bottom of said recess, and a medium-permeable member is disposed across said recess to define a chamber in which said object is disposed.

10. A system as defined in claim 1 in which a sheet of anisotropic material, of a thickness no greater than one-half acoustic wavelength at a frequency within said predetermined frequency content and exhibiting unequal strain optic coefficients in orthogonal directions parallel with said surface plane, is sandwiched between said coating and said surface of said layer.

11. A system as defined in claim 1 in which said launching means includes means for propagating sound waves in a direction generally parallel to said surface plane and for coupling said sound waves to said medium to develop said acoustic waves.

12. A system as defined in claim 11 wherein said propogating means includes a substrate having a surface exposed to said medium and along which said sound waves travel in the surface-wave mode to develop said acoustic waves in a compressional-wave mode.

13. A system as defined in claim 1 in which said means for measuring said variations includes means responsive to different Doppler shifts in said reflection component, corresponding respectively to different spectra of scattered waves of acoustic energy in respective different paths, for separating the respective different spectral information.

14. A system as defined in claim 1 wherein said acoustic waves propagate along a pair of paths that define respectively opposing acute angles to a normal to said surface plane.

15. In a system for recording an acoustic hologram or image of an object by irradiating the object with acoustic waves of a predetermined frequency content to develop a field of acoustic vibrations in a selected surface plane beyond said object in the path of said acoustic waves, scanning the surface plane with a focused light beam and measuring variations in a reflection component of light from the surface plane, acousto-optic apparatus comprising:
a medium in which said object is immersed and which subjects said acoustic waves propagating therein to a predetermined attenuation per unit length;
means for launching said acoustic waves along at least one path toward said object and at an acute angle to said surface plane, whereby acoustic waves in one portion of said path travel a greater distance to said surface plane than acoustic waves in a laterally spaced different portion of said path;
compensating means included in said launching means for effectively equalizing the amplitude of said acoustic waves arriving at said surface plane in correspondence with the difference in attenuation of the waves in the respective ones of said path portions;

and a light-reflective film located in said surface plane.

16. A system as defined in claim 15 in which said compensating means includes a layer of material partially attenuative of said acoustic waves in an amount which varies substantially linearly in a direction lateral to said path and proportional to the decrease in distance of portions of said launching means for corresponding portions of said surface plane.

17. A system as defined in claim 15 in which said launching means includes a compressional-mode transducer coupled with an acoustic phase grating disposed substantially parallel to said scanned surface plane to direct acoustic energy toward said object.

* * * * *